(12) United States Patent
Munsinger et al.

(10) Patent No.: US 7,430,964 B1
(45) Date of Patent: Oct. 7, 2008

(54) SAFE AND ARM DEVICE AND METHOD OF USING THE SAME

(75) Inventors: Terrence Lane Munsinger, Ridgecrest, CA (US); David L. Riggs, Ridgecrest, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/894,634

(22) Filed: Aug. 8, 2007

Related U.S. Application Data

(63) Continuation of application No. 11/100,234, filed on Mar. 31, 2005, now Pat. No. 7,320,285.

(51) Int. Cl.
*F42C 15/32* (2006.01)

(52) U.S. Cl. .............. 102/229; 102/228; 102/225

(58) Field of Classification Search ............ 102/221, 102/222, 223, 224, 225, 226, 227, 228, 229
See application file for complete search history.

(56) References Cited

U.S. PATENT DOCUMENTS

| | | | | |
|---|---|---|---|---|
| 4,380,197 A | * | 4/1983 | Eaton | 102/228 |
| 4,526,104 A | * | 7/1985 | Brauer et al. | 102/228 |
| H000492 H | * | 7/1988 | Kong et al. | 102/229 |
| 4,899,659 A | * | 2/1990 | Hardt | 102/229 |
| 4,953,475 A | * | 9/1990 | Munach et al. | 102/229 |
| 7,320,285 B1 | * | 1/2008 | Munsinger et al. | 102/229 |

* cited by examiner

*Primary Examiner*—James S Bergin
(74) *Attorney, Agent, or Firm*—Robert R. Lerma

(57) ABSTRACT

A safe and arm device and method for a fuze in a bomb utilizing a piston and a drive shaft to rotate a rotor in and out of the safe and armed positions. The piston is operated by a difference in air pressure within the fuze as the bomb leaves its delivery vehicle.

7 Claims, 4 Drawing Sheets

SAFE AND ARM DEVICE AND METHOD OF USING THE SAME

CROSS-REFERENCE TO RELATED APPLICATIONS

This is a continuation application claiming the benefit of a parent application, Ser. No. 11/100,234 filed on Mar. 31, 2005, now U.S. Pat. No. 7,320,285 the entire disclosure of which is incorporated herein by reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefore.

FIELD OF THE INVENTION

The present invention relates generally to a safe and arm device, and more particularly to a pressure activated safe and arm device and method of using the same.

BACKGROUND OF THE INVENTION

The primary purpose of a safe and arm (S&A) device is to prevent accidental functioning of a main charge of explosive (military or otherwise) in a fuze prior to arming. Typically, in an electromechanical S&A device, a sensitive primary explosive is physically separated from a booster explosive by an interrupter or barrier component. The barrier component, often a slider or rotor, interrupts the explosive path and thus prevents detonation of the booster and main charge prior to arming. Arming occurs by moving the barrier component to align the explosive elements.

In some applications it is desirable to operate a safe and arm device according to a fluid pressure differential, such as in the event of dropping a bomb from an airplane. But if there is a direct link between the barrier component and the pressure differential then the device may be sensitive to pressure fluctuations other than those meant to arm the device. Therefore, there is a need for a safe and arm device wherein the arming of the device is indirectly affected by the pressure differential.

SUMMARY OF THE INVENTION

An embodiment of the present invention includes a safe and arm device for a fuze in a bomb including an arming lanyard, with a first end of the arming lanyard attached to a delivery vehicle, and a second end attached to a manifold valve/firing pin, causing a translational movement of the manifold valve/firing pin when the bomb leaves the delivery vehicle and causing the removal of a sealing plug and the breaking of a shear pin. The translational movement of the manifold valve/firing pin opens an HP path for air movement into and out of a high pressure (HP) area and opens an LP path for air movement into and out of a low pressure (LP) area. The HP area and LP areas are separated by a diaphragm mounted within the fuze. A piston is translationally moveable within the fuze by a predetermined pressure acting upon the piston caused by the entry of air through the manifold valve/firing pin as the bomb moves through the atmosphere. The translational movement of the piston is opposed by a biasing spring connected to the piston preventing movement of the piston until the predetermined pressure is attained and keeping the piston in a safe position when the predetermined pressure is not obtained. The translational movement of the piston within the fuze compresses a drive spring positioned around a drive shaft attached to the piston, pushing against the drive shaft causing a translational movement of the drive shaft. The drive shaft has a plurality of driving balls residing in a plurality of hemispherical indentations located around the drive shaft, the driving balls being free to move in said hemispherical indentations. A rotor is mounted axially around the drive shaft so as to allow rotation of the rotor within the fuze from a safe position to an armed position. The rotor has a plurality of electrically initiated detonators connected to a plurality of shorting contacts when the rotor is in the safe position and aligned with a plurality of detonating contacts in the armed position. The rotor has a plurality of helical grooves dimensioned and configured so as to accept the movement of the driving balls within the hemispherical indentations of the drive shaft caused by the translational movement of the drive shaft, wherein the rotor rotates from the safe position to the armed position as the driving balls travel along the helical grooves of the rotor. The device further includes an exhaust regulator located on the LP path, for adjusting a rate of air exhaustion from the LP area, thereby affecting the time required for the rotor to rotate from the safe position to the armed position (the arming rate). The manifold valve/firing pin, upon impact of the bomb, with the rotor in the armed position, drives against a plurality of piezo crystals connected to the electrically initiated detonators, the piezo crystals generating an electrical pulse directed to the detonating contacts via the electrically initiated detonators, thereby initiating a detonation of a plurality of explosive leads connected to said detonating contacts, thereby causing an explosion of the bomb.

Another embodiment of the present invention includes a method for operating a safe and arm device for a fuze in a bomb, including creating a translational movement of a manifold valve/firing pin by providing an arming lanyard, with a first end of the arming lanyard attached to a delivery vehicle, and a second end attached to a manifold valve/firing pin, causing a translational movement of the manifold valve/firing pin when the bomb leaves the delivery vehicle and causing the removal of a sealing plug and the breaking of a shear pin. The translational movement of the manifold valve/firing pin opens an HP path for air movement into and out of a high pressure (HP) area and opens an LP path for air movement into and out of a low pressure (LP) area. The HP area and LP areas are separated by a diaphragm mounted within the fuze. The method further includes providing a piston translationally moveable within the fuze by a predetermined pressure acting upon the piston caused by the entry of air through the manifold valve/firing pin as the bomb moves through the atmosphere; opposing the translational movement of the piston by utilizing a biasing spring connected to the piston preventing movement of the piston until the predetermined pressure is attained and keeping the piston in a safe position when the predetermined pressure is not obtained; compressing a drive spring positioned around a drive shaft attached to the piston due to translational movement of the piston within the fuze, thereby pushing against the drive shaft causing a translational movement of the drive shaft; providing a plurality of driving balls residing in a plurality of hemispherical indentations located around the drive shaft, the driving balls being free to move in said hemispherical indentations; and rotating a rotor mounted axially around the drive shaft so as to allow rotation of the rotor within the fuze from a safe position to an armed position. The rotor has a plurality of electrically initiated detonators connected to a plurality of shorting contacts when the rotor is in the safe position and aligned with a plurality of detonating contacts in the armed position. The rotor has a plurality of helical grooves dimensioned and configured so as to accept the movement of the driving balls within the hemispherical indentations of the drive shaft caused by the translational movement of the drive shaft, wherein the rotor rotates from the safe position to the armed position as the driving balls travel along the helical grooves of the rotor. The method further includes adjusting a rate of air exhaustion from the LP area utilizing an exhaust regulator located on the LP path, thereby affecting the time required for the rotor to rotate from the safe position to the armed position (the arming rate); and driving the manifold valve/firing pin, upon impact of the bomb, with the rotor in the armed position, against a plurality of piezo crystals connected to the electrically initiated detonators, the piezo crystals generating an electrical pulse directed to the detonating contacts via the electrically initiated detonators, thereby initiating a detonation of a plurality of explosive leads connected to said detonating contacts, thereby causing the explosion of the bomb.

It is to be understood that the foregoing general description and the following detailed description are exemplary and explanatory only and are not to be viewed as being restrictive of the present invention, as claimed. The present invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION OF THE INVENTION

Before explaining the disclosed embodiments of the present invention in detail it is to be understood that the invention is not limited in its application to the details of the particular arrangement shown since the invention is capable of other embodiments. Also, the terminology used herein is for the purpose of description and not of limitation. In the figures the same reference numbers are used to identify the same components.

Embodiments of the present invention include a launch sensing, fluid pressure activated safe and arm device for a fuze in a bomb and a method of using the same that functions explosively when the proper target environment is provided. The device utilizes a piston and a drive shaft to rotate a rotor in and out of the safe position. The piston is operated by a difference in air pressure that enters the fuze as the bomb leaves its delivery vehicle.

Figure 1:
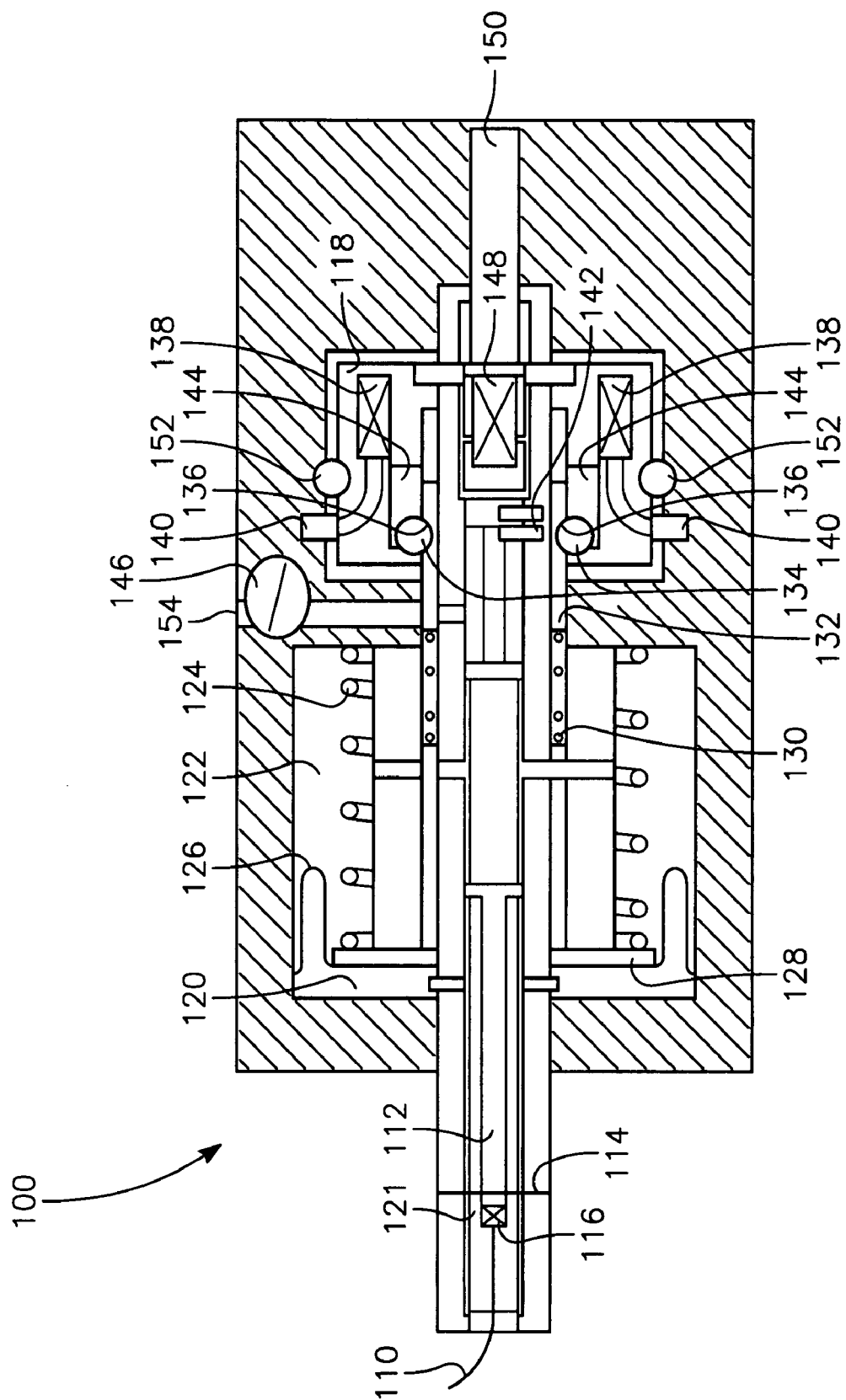
FIG. 1 is a side cut away view of the safe and arm device in the safe position according to embodiments of the present invention.

FIG. 1 is a side cut away view of an embodiment of the present invention in the safe position. The fuze 100 incorporates an arming lanyard 110 that is attached to a delivery vehicle, such as an aircraft or an artillery piece. When the vehicle releases the bomb, the arming lanyard 110, that is attached firmly to the delivery vehicle, translates a manifold valve/firing pin 112 and removes a sealing plug 116 from the high pressure inlet port 121 of the manifold valve/firing pin 112. In addition it causes the breaking of the shear pin 114 installed as a safety feature. This translation opens an HP (high pressure) path 210 (shown in FIG. 2) for fluid (air) movement into and out of the high pressure (HP) area 120 and opens an LP (low pressure) path 220 (shown in FIG. 2) for fluid (air) movement into and out of the low pressure (LP) area 122 of the fuze's interior.

The fuze 100 incorporates a piston 128 and drive shaft 132 assembly that is translationally moveable by a predetermined fluid (air) pressure differential acting on the manifold valve/firing pin 112 as the bomb travels. This fluid pressure differential is opposed by a biasing spring 124, which substantially prevents movement of the piston 128 until the predetermined required pressure is attained. The biasing spring 124 also assists in returning the rotor 118 to the safe position if the pressure differential is less than that required or if the pressure differential subsides from the predetermined required level. The required pressure differential ranges from about 4 to about 10 psi.

The piston 118 and drive shaft 132 are dimensioned so that a certain amount of travel of the piston 128 is necessary before movement thereof is transmitted via the drive shaft 132 to the rotor 118. Further, a movement-arresting detent mechanism is provided by the movement of the piston 128 within the tubular section of the drive shaft 132, so that movement of the drive shaft 132 and rotational movement of the rotor is precluded until there has been sufficient travel of the piston.

The drive shaft includes driving balls 134 as an integral feature, which provide a mechanical lock on the rotor 118 when in the safe position and drive the rotor 118 to the armed position. The driving balls 134 are partially received in hemispherical indentations 136 so that they are free to move. The driving balls 134 are located adjacent to the inside surface of the rotor 118. Additionally, the driving balls 134 are partially received within helical grooves 144 defined by the periphery of the axial bore of the rotor 118.

Figure 2:
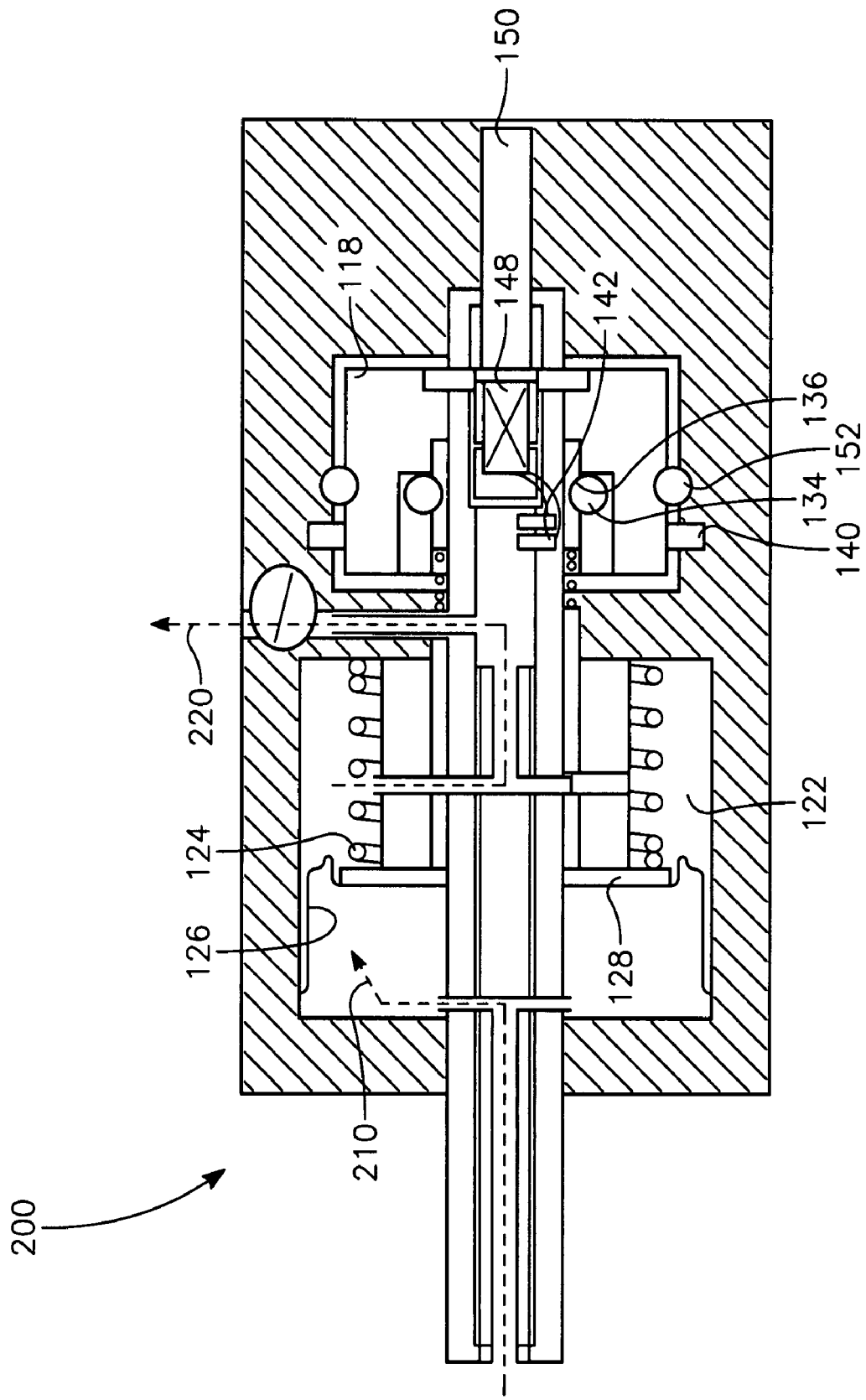
FIG. 2 is a side cut away view of the safe and arm device in the armed position according to embodiments of the present invention.

An embodiment of the present invention further includes a disk-shaped rotor 118 that is mounted to allow rotation from the safe position to the armed position (shown in FIG. 2). Bearing balls 152 assist in supporting the rotor 118 as it rotates. The rotor 118 includes electrically initiated detonators 138. When the rotor 118 is in the in the safe position, the electrically initiated detonators 138 are misaligned mechanically with the next component of the explosive firing train and electrically shorted to shorting contacts 140 to preclude inadvertent initiation from spurious electrical emanations.

Figure 4B:
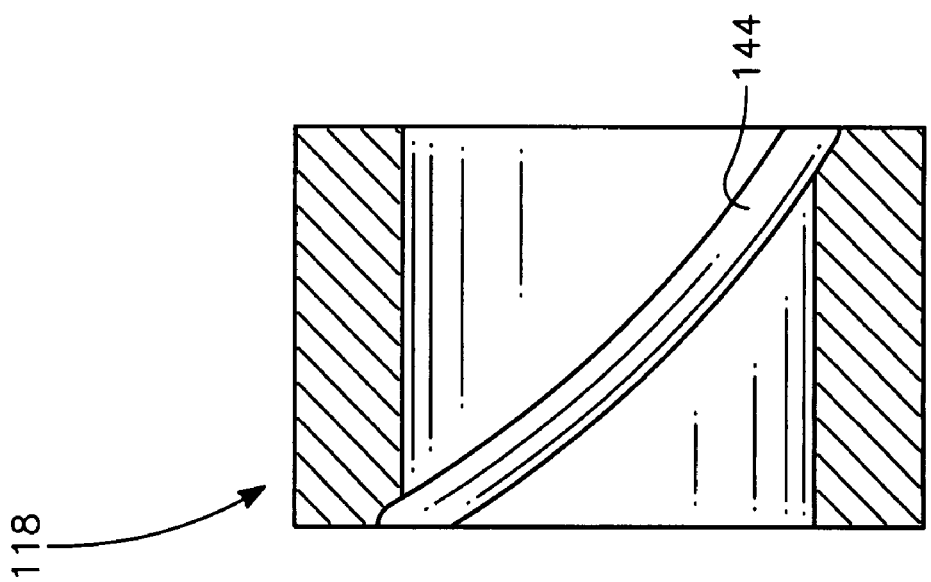
FIGS. 4A-B are detailed views of the helical groove components of the rotor of the safe and arm device in the safe position according to embodiments of the present invention.
Figure 4A:
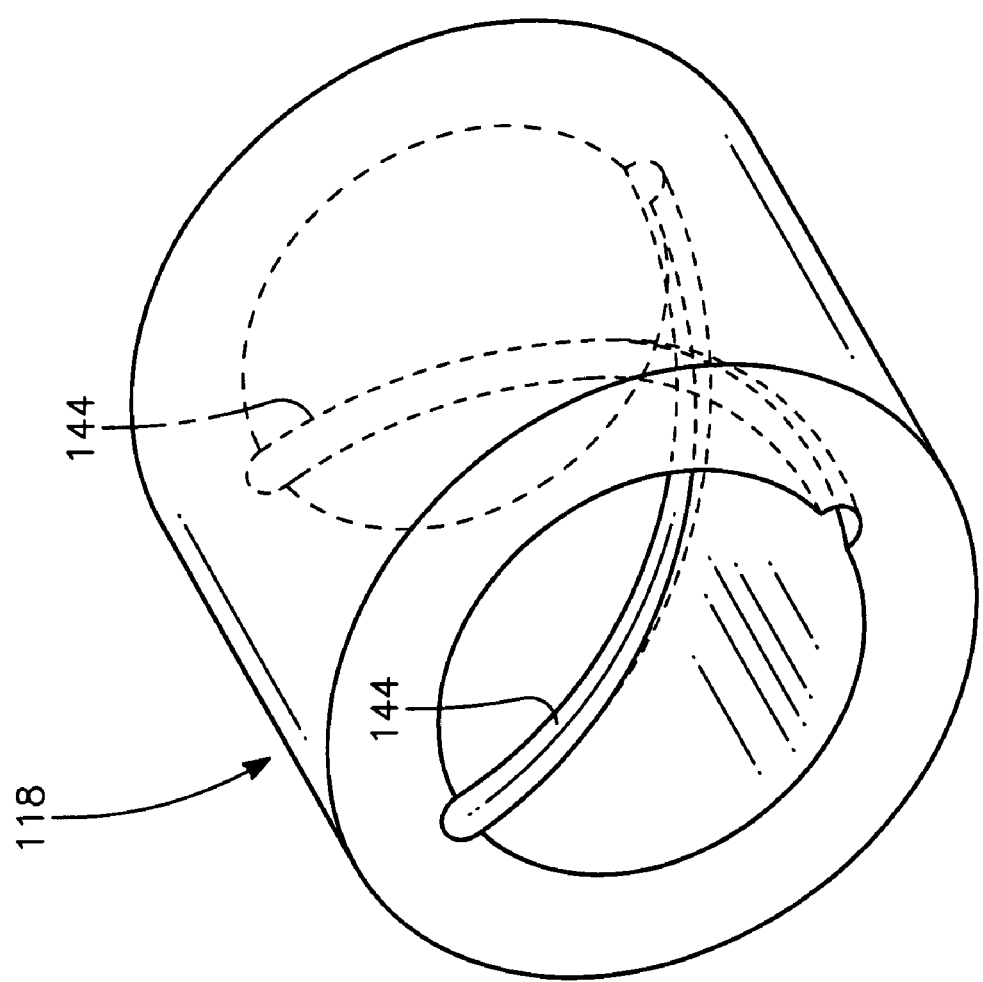

The piston 128 and drive shaft 132 assembly is axially aligned with the inside axial bore of the rotor 118. Translational movement of the drive shaft 132 is converted to rotational movement of the rotor 118 by way of the driving balls 134. The inside bore of the rotor 118 contains helical grooves 144 that accept the placement and movement of the driving balls 134. (See FIGS. 4A-B) The helical grooves 144 of the rotor 118 track the translationally driven driving balls 134, thereby imparting a rotational movement to the rotor 118. This arrangement of elements permits the safe and arm device not only to switch from a safe to an armed position, but also from a partially armed to a safe position if a predetermined pressure is not sensed or if the pressure differential acting upon the piston 128 is raised above the predetermined magnitude but then falls below the predetermined magnitude before the set arming time (discussed below) has transpired.

When the rotor 118 is in the armed position as shown in FIG. 2, the electrically initiated detonators 138 are mechanically aligned with detonating contacts 142 and electrically enable the explosive lead 150 to receive a firing pulse from the piezo crystals 148 via the detonating contacts 142 when they are impacted by the manifold valve/firing pin 112. The rotor 118 contains shorting contacts 140 which electrically short the electrically initiated detonators 138 in the safe position. The time required for the rotor 118 to translate from the safe to armed position is selected by adjusting the rate of fluid exhaustion from the LP area 220 of the fuze assembly. This is accomplished by setting the gap of a needle valve on an LP exhaust regulator 146, which is placed on the low pressure vent 154, so as to achieve the desired set arming time for translation of the rotor 118.

Figure 3:
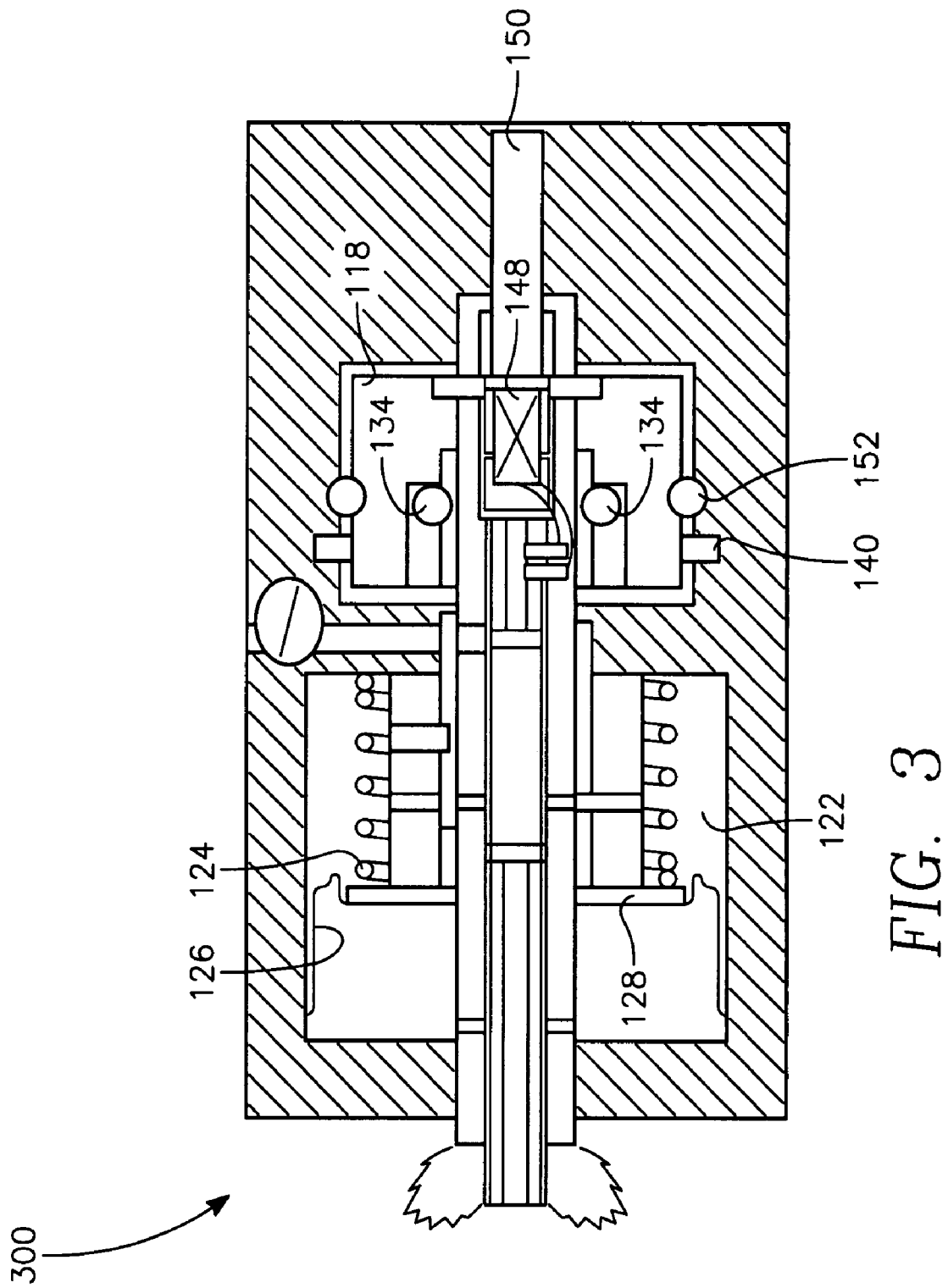
FIG. 3 is a side cut away view of the safe and arm device at the time of impact according to embodiments of the present invention.

FIG. 3 illustrates the safe and arm device at the time of impact. On impact the manifold valve/firing pin 112 is driven against piezo crystals 148 when the rotor 118 is in the armed position. The manifold valve/firing pin 112 is prevented from being able to contact the piezo crystals 148 when the rotor 118 is in the safe position by rotor lock pins (not shown). When the rotor 118 is in the armed position, the driving balls 134 fit in the helical grooves 144 in the rotor, which allows the firing pin 112 to translate through the rotor 118 and impact the piezo crystals 148.

Upon impact the piezo crystals 148 generate an electrical firing pulse, which is directed to the electrically initiated detonators 138 via electrical leads to the detonator initiation contacts 142. This causes the detonator initiation contacts 142 to be initiated and to propagate shock, high temperatures, and fragments to the explosive leads 150. The explosive leads 150 in turn propagate the next component in the explosive firing train causing the explosion of the bomb. The explosive leads are stationary and are an integral component of the housing.

In one embodiment of the present invention, to provide rotor positional information, the rotor 118 is marked with an indicator, such as a decal, which defines the rotor position as safe or armed. The indicator is visible from outside of the fuze housing via an optical element, which is an integral component of the housing. In another embodiment, a locking mechanism operable via the HP inlet 121 or LP outlet 154 ports, provides a means by which the rotor 118 can be locked in either the safe or the armed position (for example the biasing spring 124 and drive spring 130 lock the rotor 118 in the armed position if the pressure differential equals the required pressure). In another embodiment, to compensate for impact loadings to the device caused by conditions such as either rough handling or momentary but extreme ambient pressure fluctuations, safeguard features such as a movement arresting mechanism have been incorporated into the device. For example, the biasing spring 124 and drive spring 130 hold the rotor 118 in the safe position if the pressure differential is less than the required pressure, or if the pressure differential subsides from the required pressure.

Although the description above contains much specificity, this should not be construed as limiting the scope of the invention but as merely providing an illustration of an embodiment of the invention. Thus the scope of this invention should be determined by the appended claims and their legal equivalents.

What is Claimed is:

1. A method for operating a safe and arm detonation device comprising the steps of:
    applying a pulling force to an arming lanyard attached to a sealing plug, wherein said sealing plug is in direct contact with a firing pin;
    releasing said firing pin by breaking a shear pin in contact with said firing pin wherein said pulling force when applied to said arming lanyard causes a first translational movement of said firing pin and said first translational movement of said sealing plug away from said firing pin;
    opening a high pressure path for a high pressure air movement into a diaphragm, wherein said high pressure air movement flows into and inflates said diaphragm when said sealing plug is removed away from said firing pin;
    opening a low pressure path for a low pressure air movement, wherein said low pressure air movement is caused by an inflation of said diaphragm;
    moving a piston in a straight line motion using an inflation force generated by the inflation of said diaphragm;
    opposing the straight line motion of said piston using a biasing spring in contact with said piston, said biasing spring opposing the straight line motion of said piston until a compression force which compresses said biasing spring is attained;
    compressing a drive spring positioned in a drive shaft, wherein said drive spring is compressed by said straight line motion of said piston which pushes against said drive shaft causing a second translational movement of said drive shaft;
    rotating a rotor from a safe position to an armed position by converting said second translational movement of said drive shaft to rotational movement of said rotor, wherein said rotor includes a plurality of electrically initiated detonators, said detonators being connected to a plurality of shorting contacts when said rotor is in the safe position and aligned with a plurality of detonating contacts when said rotor is in said armed position, said rotor being axially aligned with said diaphragm, said firing pin, said biasing spring and said drive shaft;
    adjusting a rate of air exhaustion from a low pressure area connected to said low pressure path utilizing an exhaust regulator located within said low pressure path, wherein said rate of air exhaustion determines a time period required for said rotor to rotate from said safe position to said armed position; and
    detonating said plurality of electrically initiated detonators with an electrical pulse generated by piezo crystals when said rotor is in the armed position and said piezo crystals are impacted by said firing pin which causes said electrically initiated detonators to detonate.

2. The method of claim 1, wherein said rotor includes an externally visible indicator providing rotor positional information.

3. The method of claim 1, wherein a locking mechanism operable via said high pressure path or said low pressure path provides a means to lock said rotor in the safe position.

4. The method of claim 1, wherein safeguard features, including a movement arresting mechanism, are incorporated into the safe and arm detonation device to compensate for impact loadings to said safe and arm detonation device caused by rough handling or momentary but extreme ambient pressure fluctuations.

5. The method of claim 1, wherein said rotor includes a plurality of helical grooves dimensioned and configured to accept movement of a plurality of driving balls which track within said helical grooves when said rotor rotates from said safe position to said armed position.

6. The method of claim 1, wherein said exhaust regulator is an adjustable pin valve.

7. The method of claim 1, wherein the high pressure air movement into said diaphragm creates a pressure differential of about 4 to 10 pounds per square inch to compress said biasing spring.

* * * * *